US008275413B1

(12) United States Patent
Fraden et al.

(10) Patent No.: US 8,275,413 B1
(45) Date of Patent: Sep. 25, 2012

(54) WIRELESS COMMUNICATION DEVICE WITH INTEGRATED ELECTROMAGNETIC RADIATION SENSORS

(75) Inventors: Jacob Fraden, San Diego, CA (US); David A. Pintsov, San Diego, CA (US)

(73) Assignee: Fraden Corp., San Diego, CA (US)

( * ) Notice: Subject to any disclaimer, the term of this patent is extended or adjusted under 35 U.S.C. 154(b) by 0 days.

(21) Appl. No.: 13/303,054

(22) Filed: Nov. 22, 2011

Related U.S. Application Data

(60) Provisional application No. 61/627,070, filed on Sep. 17, 2011.

(51) Int. Cl.
*H04M 1/00* (2006.01)
*H04B 1/16* (2006.01)

(52) U.S. Cl. ..................... 455/556.1; 455/344

(58) Field of Classification Search .............. 455/556.1, 455/557, 550.1, 67.11, 423, 344
See application file for complete search history.

(56) References Cited

U.S. PATENT DOCUMENTS

| | | | |
|---|---|---|---|
| 3,971,943 A | 7/1976 | Jeunehomme | |
| 4,854,730 A | 8/1989 | Fraden | |
| 4,986,672 A | 1/1991 | Beynon | |
| 5,592,148 A | 1/1997 | Morales | |
| 6,594,494 B1 * | 7/2003 | Kakehi | 455/437 |
| 6,880,968 B1 * | 4/2005 | Haar | 374/131 |
| 6,906,663 B2 | 6/2005 | Johnston | |
| 6,934,515 B2 * | 8/2005 | Wallach | 455/67.13 |
| 6,992,580 B2 * | 1/2006 | Kotzin et al. | 340/539.11 |
| 7,545,269 B2 * | 6/2009 | Craig et al. | 340/539.26 |
| 7,576,785 B2 * | 8/2009 | Jung et al. | 348/227.1 |
| 7,611,278 B2 | 11/2009 | Hollander et al. | |
| 7,947,222 B2 | 5/2011 | Bae et al. | |
| 7,960,700 B2 * | 6/2011 | Craig et al. | 250/370.01 |
| 2005/0272468 A1 * | 12/2005 | Tsai et al. | 455/556.1 |
| 2007/0129105 A1 | 6/2007 | Shen | |
| 2007/0282218 A1 | 12/2007 | Yarden | |
| 2010/0125438 A1 | 5/2010 | Audet | |

* cited by examiner

*Primary Examiner* — Sonny Trinh

(57) ABSTRACT

A hand-held mobile communication device, such as smart telephone, incorporating sensors and signal conditioning modules for measuring signals from external sources of electromagnetic radiation (EMR) in the low, radio, ultraviolet, and infrared spectral ranges. These include the detector for receiving and monitoring electromagnetic fields originating from various external sources of radiation that pose potential health hazards or may interfere with various electronic devices. The mobile phone equipped with such sensors could alternate between communication and monitoring functions. Other integrated EMR sensors are a photodiode for the ultraviolet detection to monitor the user's sun exposure and a thermopile for non-contact measurement of temperature of humans or inanimate objects. This infrared sensor in combination with a photographic digital camera and a pattern recognition signal processing allows measuring temperatures at specific locations and from optimal distances to the surface of the object to enhance accuracy of non-contact temperature measurements.

17 Claims, 6 Drawing Sheets

WIRELESS COMMUNICATION DEVICE WITH INTEGRATED ELECTROMAGNETIC RADIATION SENSORS

This application claims the priority of provisional U.S. patent application Ser. No. 61/627,070 filed on 17 Sep. 2011. The disclosure of the prior related application is hereby fully incorporated by reference herein.

1. BACKGROUND OF THE INVENTION a. Field of the Invention

The present invention relates generally to wireless communication devices. More specifically, this invention relates to mobile communication devices that incorporate various electromagnetic radiation sensors.

b. Description of Prior Art

Most wireless communication devices (cellular or mobile telephones) incorporate additional non-communication features, such as imaging (photo and video), personal planners, games, etc. There are numerous inventions that attempt to include among these additional features the measurement and/or monitoring of external signals such as temperature. These inventions are exemplified by the following selection that is incorporated herein as references.

U.S. Pat. No. 7,947,222 issued to Bae et al. teaches compensation for ambient temperature for measuring response of a biosensor. US patent Publication No. 2007/0129105 issued to Shen describes a contact ear thermometer having an elongated ear probe embedded in a mobile communication device. These and other inventions demonstrate that wireless communication devices (a mobile phone, e.g.) are in fact multi-function instruments whose purpose is much broader than just transmitting and receiving acoustic signals. There are numerous additional functions that such devices can perform by utilizing a synergy between their components and additional sensors. These sensors, among many, may include sensors for monitoring electromagnetic radiation (EMR) originated from external sources. The EMR forms an ambient electromagnetic field (EMF). Spectrum of the field may be extremely broad ranging from constant levels of electric and magnetic fields to alternating EMF of very long wavelengths approximately from $6 \cdot 10^6$ m (corresponding to frequency of 50 Hz) to UV and further to X-rays. The present invention relates to three rather broad portions of the EMF spectrum. One is the portion having wavelengths from approximately $5 \cdot 10^6$ m to 2.5 cm, that is from very low frequency of 50 Hz to very high frequency of about 12 GHz that embrace EMRs emanated from high-voltage power lines, electric motors and generators, fluorescent lights, wireless routers and cellular telephones. These EMF create the so-called low and radio-frequency EMF pollution that may have negative effects on humans and interfere with electronic equipment. Humans subjected to strong EMF may have increased risk of developing serious diseases, such as cancer, loss of reproductive functions, etc. Electronic equipment subjected to the interfering EMF may malfunction.

Another portion of the spectrum that is also a subject of this invention is the mid and far infrared spectral range from about $3 \cdot 10^{-6}$ to $15 \cdot 10^{-6}$ m that is called a thermal infrared EMR. The non-contact infrared thermometers operate in this range.

And the third portion of the EMR spectrum is ultraviolet (UV) having wavelengths in the range of $200\text{-}400 \cdot 10^{-9}$ m. A UV monitoring may be useful for health reasons to measure the level of personal exposure to sun radiation. The free-standing UV monitors are known in art as exemplified by the U.S. Pat. No. 3,971,943 issued to Jeunehomme et al. that is incorporated herein as a reference.

There are numerous patents related to non-contact temperature measurements by means of thermal (infrared) radiation passively emanating from a surface of an object. Typical sensors that operate in the infrared (IR) range of thermal radiation are either thermopiles or pyroelectrics as exemplified by the industrial non-contact thermometer of U.S. Pat. No. 4,986,672 issued to Beynon and the medical infrared thermometer of U.S. Pat. No. 4,854,730 issued to Fraden. When temperature is measured from the surface (skin) of a human subject, it is desirable to infer from it the inner body (core) temperature for the diagnostic purposes. The algorithm for computing the core body temperature from the body surface temperature is known in the art and is exemplified by the U.S. Patent publication No. 2007/0282218 issued to Yarden. All above patents and publication are incorporated herein as references.

When temperature is measured remotely by means of the IR EMR, it is important to find a correct location on the surface of the object where the temperature should be measured, and an optimal distance from that location to the IR sensor. One known method for finding the desired distance is to incorporate a proximity sensor into an IR thermometer as exemplified by the U.S. Pat. No. 7,611,278 issued to Hollander et al. that is incorporated herein as a reference. However, the cost and complexity of incorporating a proximity sensor in a mobile communication device together with proximity sensor's inability to determine the correct position of the IR sensor make it desirable to find an alternative solution.

Another EMR measurement system that is subject of the present invention is used for monitoring the EMF pollution. The pervasive nature of EMF in modern life, and particularly in workplaces and at home causes legitimate concerns about potential, particularly long term, health effects of EMR. Devices that emit this radiation include computers, computer terminals, computer tablets, cellular phones, routers, televisions, various Wi-Fi and Bluetooth devices. The exposure of children and young adults to mobile telephones and mobile electronic tablets reached such a level that in several countries there is either adopted or proposed legislation limiting use of such devices by children. On the other hand, the ubiquitous nature of mobile communication devices makes them the most natural candidates for measuring the levels of ambient EMR. While there are numerous specialized devices designed to gauge the level of EMF, the mobile communication devices already possess most of the needed components that would allow to perform yet another useful function: to measure and alert the user to potentially dangerous levels of surrounding EMF and simultaneously locate the places in her workspace or living quarters where such levels are lower, thus allowing the user to make intelligent decisions about placement of electronic devices both at work places and at home. Patent Publication US 2010/0125438 issued to Audet, incorporated here as a reference, teaches a method of measuring levels of EMF energy and storing a history of such measurements for each user with potential application to health care. An apparatus, system and a user graphical interface is taught, together with a communication system. Therefore this invention requires a special free-standing apparatus that may be expensive and inconvenient to carry around. U.S. Pat. No. 5,592,148 issued to Morales teaches a ranging device that issues a warning output of the EMF signal generated by various devices. Most of the key components for reliable detection of a broad-band EMF signal by a free-standing apparatus are know in art as exemplified by the U.S. Pat. No.

6,906,663, issued to Johnston incorporated here as a reference, that teaches an antenna, power meter, signal equalizer and other components.

Therefore, a goal of the present invention is to combine functionalities of the built-in digital photo camera, a non-contact thermometer and a pattern recognition algorithm for guiding the user for a proper positioning of the mobile communication device, thus insuring the optimal conditions for obtaining a reliable temperature measurement.

Another goal of this invention is to utilize the wireless capabilities of a mobile communication device for detecting and measuring the EMF signals for the purpose of assessing levels of ambient radiation.

And another goal of this invention is to integrate a UV detector with a mobile communication device. Further goals of the invention will be apparent from the foregoing description of preferred embodiments.

2. SUMMARY OF THE INVENTION

A mobile communication device incorporates one or more sensing means for receiving and processing the EMF signals of different spectral ranges. Different spectral ranges require different types of sensors. For detecting the ambient electro-magnetic radiation pollution in a low and radio frequency ranges an antenna is employed, preferably the same antenna that is used for a mobile communication. For the UV range a special photo-diode is used, while for a non-contact temperature measurement the electro-magnetic radiation is detected by a thermopile. When the electro-magnetic radiation pollution reaches a predetermined threshold, an alarm is generated to alert the user.

A digital camera of the mobile phone continuously obtains images of the external object, such as a human face, processes the images for identifying facial landmarks and guides the user towards the optimal aim of the thermal radiation sensor at the pre-identified area of the face in relation to the landmarks. The obtained thermal signal is processed by the microprocessor for computation, display and transmission of temperature data.

DETAILED DESCRIPTION OF PREFERRED EMBODIMENTS

A mobile communication device, such as cellular telephone having a digital imaging photo camera, among other components incorporates a non-contact temperature module. The module includes the infrared (IR) temperature detector, optical elements, reference temperature sensor and other relevant components known in art.

Figure 1:
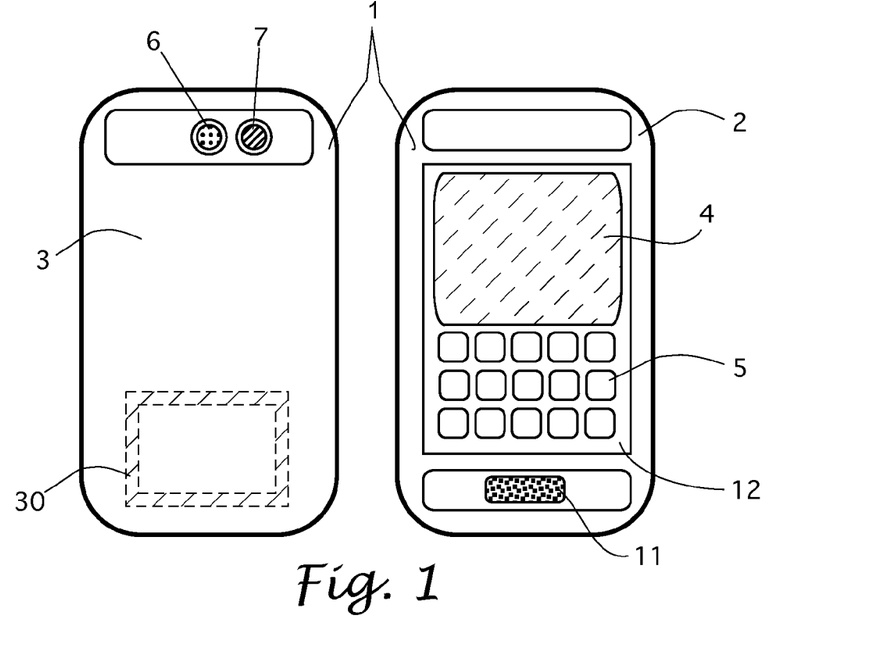
FIG. 1 shows a cell phone back side (left) and front side (right) having an IR lens and video lens.

The central problem in non-contact temperature measurement is finding a location on the surface of the subject or object that is best suited for such measurement that is free from various obstructions and occlusions such as clothing, hair, decorations, etc. Furthermore, due to limitations of the optical components, the non-contact IR sensor should be positioned within a specific range of distances from the surface of the object where temperatures are measured. On the human face, these locations include the area of the temple within about 1 cm of the corner of the eye and the area of the forehead above the root of the nose between the eyes. The optimal range of distances between the surface of the skin and the IR sensor is between 2 and 10 cm. The present invention utilizes the imaging capabilities of a camera-equipped communication device to assist in accurate positioning of the sensor embedded into the communication device. The invention provides the device's operator with a sound and visual indicators signaling by way of feedback the optimal position of the embedded sensor for taking temperature measurement. This feedback is suitable for both taking the operator's own temperature as well as taking the temperature of another person. FIG. 1 illustrates the back 3 and front 2 sides of the mobile communication device 1. The lens 6 of the digital photographic camera is positioned alongside with the lens 7 of an IR sensor. The phone 1 contains a display 4 and either hard or soft keys 5 positioned on the monitor 12. The speaker 11 can provide an audio feedback either by spoken voice or tone. The antenna 30 (shown by a dotted line) typically is positioned inside the housing but in some cases may protrude outwardly (not shown).

Figure 9:
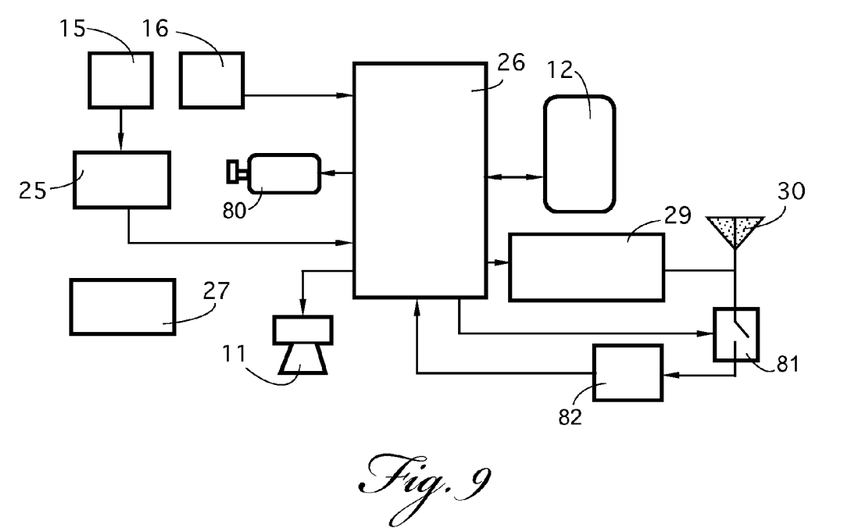
FIG. 9 is a simplified block-diagram of the cell phone with IR sensor.

FIG. 9 is a block diagram of the wireless communication device that incorporates the present invention. Power supply 27 is a source of energy for all components of the device. The microprocessor 26 (computational means that may include memory) controls all external components and performs necessary computation and image pattern recognition according to the algorithms described below. IR sensor 15 is appended with a signal conditioning circuit 25 whose purpose is to match the sensor's 15 output signal format with the input format of the microprocessor 26. Imaging sensor 16 is part of the imaging circuit. Monitor 12 displays visual information, while the speaker 11 provides audible feedback. The wireless communication module 29 that generally incorporates radio transmitter/receiver along with the antenna 30 performs wireless communication. Other essential components (like microphone, e.g.) that are part of the communication device but not required for functions of the current invention, are not shown for clarity.

Figure 2:
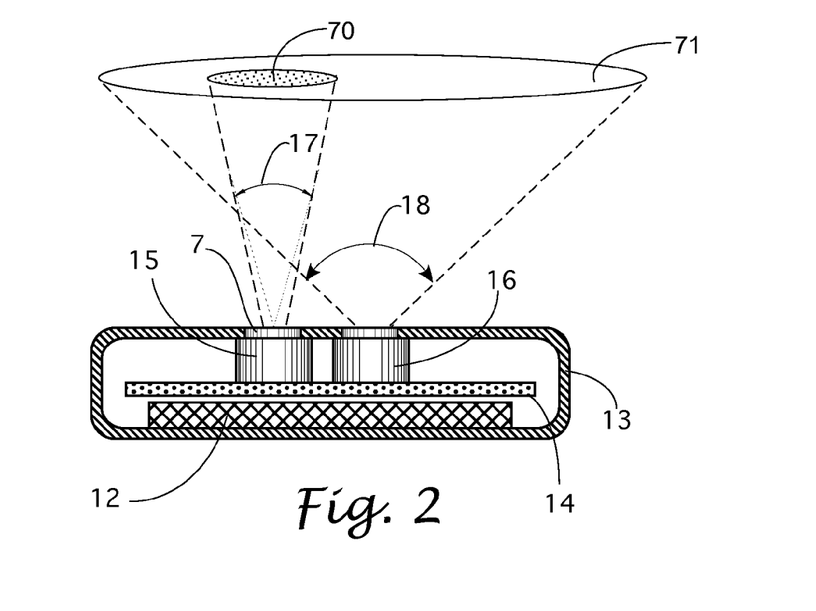
FIG. 2 illustrates a cross-sectional view of the cell phone with an IR and video sensors.

FIG. 2 shows two sensors: the IR sensor 15 and the photo imaging digital sensor 16 positioned on the circuit board 14 inside the phone housing 13. Note that the IR lens 7 is situated substantially flash with the surface of the housing 13. As a rule, the angle of view 18 of the imaging sensor 16 is much wider than the angle of view 17 of the IR sensor 15. Thus the field of view 70 of the IR sensor 15 is much smaller than the field of view 71 of the imaging sensor 16. The smaller field of view 70 is part of the larger field of view 71. For example, the angle of view 18 may be in the range of 90°, while the angle of view 17 is between 0 and 15°.

Figure 3:
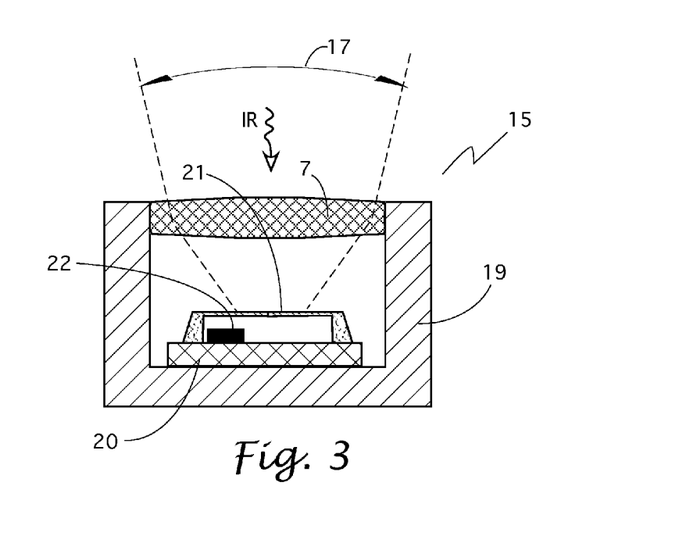
FIG. 3 shows a cross-sectional view of the IR sensor.

FIG. 3 illustrates a cross-sectional view of an IR sensor 15. It incorporates a thermopile element 21 positioned inside the metal housing 19. A reference temperature sensor 22 monitors temperature of the substrate 20. Note that the angle of view 17 is controlled by the IR focusing lens 7 that may be fabricated from silicon or germanium, preferably coated with the anti-reflective (AR) coating. The lens 7 focusing properties are achievable either by forming at least one convex surface or by etching into the lens the Fresnel grooves. An IR lens 7 is fabricated of a material suitable for operating in the mid and far infrared spectral ranges. Suitable materials are silicon and germanium. In some embodiments, instead of lens 7, a reflective focusing system may be employed. An example is a curved (parabolic) minor. These design options are well known in the art and beyond the scope of this disclosure and thus are not discussed herein in detail. The IR (thermal radiation) sensors are also well known in the art (see, for example, J. Fraden "*Handbook of modern sensors*", 4$^{th}$ ed, Springer Verlag, 2010, incorporated herein as a reference). The skin temperature is computed from signals generated by an IR sensing thermopile element 21 and the ambient reference sensor 22.

While temperature of the human skin differs significantly from the inner (core) temperature of the human body, there are well known in the art methods for conversion of the skin temperature to the inner temperature of the body (e.g. U.S. Patent publication No. 2007/0282218 issued to Yarden). Therefore, these methods are not described here.

In the preferred embodiment of the present invention, images of the face of the subject of temperature measurement are taken by the communication device's camera as the operator (user) moves the camera towards the object's face and across the face. These images can be taken with a pre-defined frequency, e.g., 5 frames a second or 10 frames a second or any other frequency that insures that at least one image is obtained when the embedded infrared sensor is within 2-10 cm distance from the temple or forehead. A conventional IR sensor contains a single sensitive pixel (thermopile 21 in FIG. 3) that collects IR signal from the surface whose optical image is formed by the multi-pixel photographic sensor 16.

The present invention teaches how to achieve aiming of the IR temperature sensor at a correct location on the surface of the object together with an optimal distance between the sensor and the surface of the object at which the temperature should be taken. This can be accomplished by two methods that are described in detail below. One method is based on automated, computer assisted, guidance of the user aiming the IR temperature sensor and the other method is based on a manual guidance.

Figure 4:
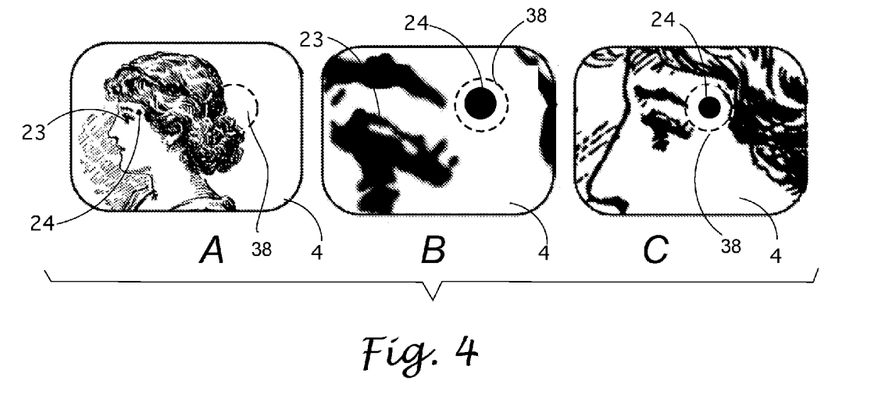
FIG. 4 shows three photographic images for three distances from the subject: too far (A), too close (B) and normal (C).

FIG. 4 shows the subject's face with the preferred IR spot 24 being located near the eye 23.

This spot 24 is the area of the skin from which the IR signal should be collected for better accuracy of measurement. The eye 23 has a distinct shape and its size varies only slightly over the human population. Thus, optical images of facial features such as eyes 23 can serve as "landmarks" that can guide the feedback system to help in correctly aiming the IR lens 7 toward the preferred location on the skin surface. The image processing of the face image allows the measurements taken at the optimal range of distances from the skin. FIG. 4-A shows an image of a human face taken from too large a distance for accurate measurement of the temperature due to interferences from the stray elements such as hair, clothing, decorations, etc. which enter the field of view 38 of the IR sensor.

Figure 5:
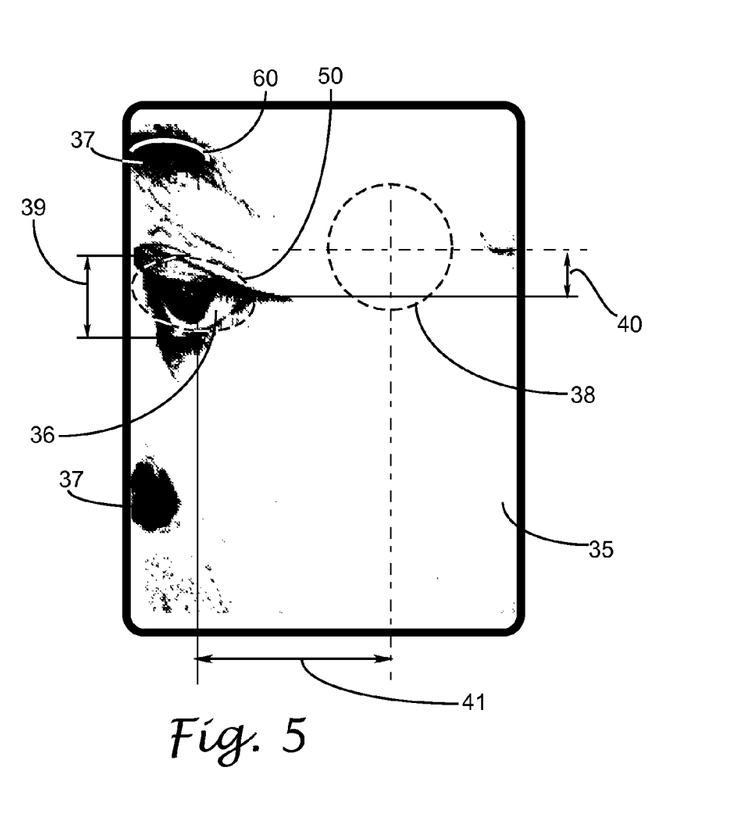
FIG. 5 illustrates positioning of IR sensor field of view in relationship to the subject's eye.

FIG. 4-B illustrates an image taken too close to the skin. While a very short distance under ideal conditions would not result in the increased measurement error, there is a possibility of touching the skin by the mobile communication device and thus cooling its surface. That may cause an excessively low temperature reading. FIG. 4-C shows an image formed from an optimal distance to the skin surface where the IR field of view 38 covers substantially the preferred IR spot 24 with minimal inclusion of stray elements. The photo image from the digital image sensor provides the necessary pattern recognition features to determine both the optimal location of the IR field of view 38 on the face image 35 (FIG. 5), and the correct distance from the IR sensor to the skin. FIG. 5 illustrates the correct size 39 of the eye 36 in the image, while dimensions 40 and 41 designate the distances from the center of the IR field of view 38 to the eye 36.

Computer-Assisted Aiming of IR Sensor

A key component of the present invention is the combined use of both the IR and the photo sensors in a manner that assures that the IR measuring location is automatically found by the system from the optical images of the subject's face. This assisted guidance is especially beneficial when the user takes temperature of herself due to her limited ability to observe the display 4 (FIG. 1), and is accomplished by finding landmarks on the human face that can be used for automated guidance of the IR sensor.

Locating features ("landmarks" in our terminology here) present in the images of human faces can be accomplished by various methods known in art, e.g.: www.cs.princeton.edu/courses/archive/fall08/cos436/FinalReports/Eye_Gesture Recognition.pdf. incorporated as a reference herein.

Another method that can be used for frontal eye detection was published in P. Wang, M. B. Green, Q. Ji, and J. Wayman "*Automatic Eye Detection and Its Validation*." Computer Vision and Pattern Recognition—Workshop, 2005, CVPR Workshops, IEEE Computer Society, Conference on, Vol. 03, 23-25 Jun. 2005, pp 164-172.

Here we describe the template matching or cross-correlation method of recognition as follows.

Figure 10:
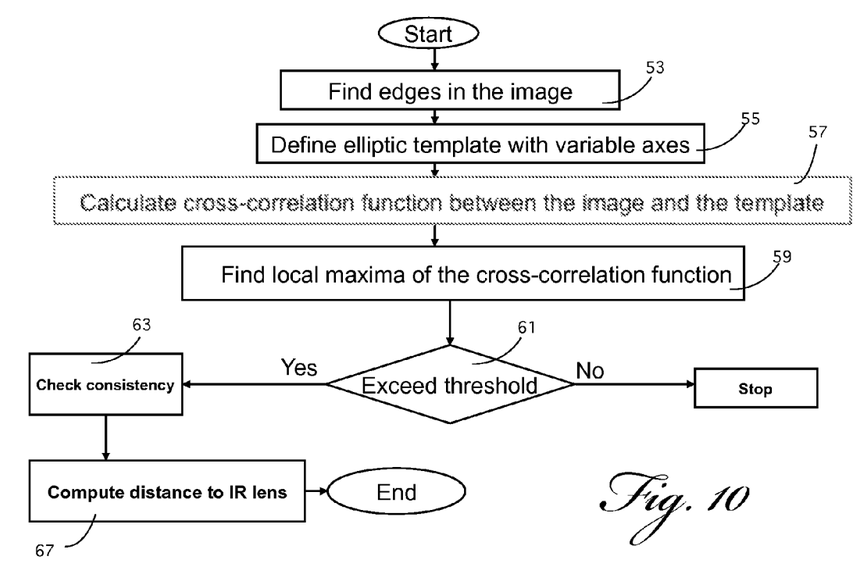
FIG. 10 depicts an algorithm for the digital image processing and landmark recognition.

The color images from a digital camera are suitably pre-processed to provide binary (bitonal, black and white) images that allow a faster execution time of the subsequent algorithms. FIG. 10 illustrates a basic flowchart of a recognition algorithm for landmarks such as eyebrows or eyelids. In the image pre-processing step, the image is first run through an edge detector such as Canny edge detector (Canny J., "Finding Edges and Lines in Images", MIT AI Laboratory Technical Report, 720, June, 1983 incorporated here as a reference), resulting in a binary image. (FIG. 10, step 53). Once this pre-processed image is obtained, the system searches for certain landmarks in this image. In the frontal image of the subject's face, these landmarks could be certain facial features such as the eyebrows, the iris with the pupil of both eyes, or the eyelids of the subject. In the profile image, the eyelids, the iris with the pupil and the eyebrows are sought for one eye. In the case of a profile image of the face, only a partial view of facial features is available the fact that suits the template matching approach.

While the template matching approach can utilize various templates, there are computational advantages in using the templates of elliptical shape as described in D. A. Pintsov, *Invariant pattern recognition, symmetry and Radon transforms*, J. of Opt. Soc. of America, A, 1989, vol. 6, No. 10, pp. 1544-1554, incorporated as a reference herein.

The described facial landmarks can be approximated by elliptical templates with variable major and minor axes since these landmarks have the shapes of partial ellipses. The ranges of axes lengths are found from the size of the corresponding facial features and the resolution of the camera FIG. 10, Step 55. The use of elliptic templates of elastic shape (see D. A. Pintsov, as above) is illustrated in FIG. 10, step 57.

The template matching via cross-correlation with an elliptic template with axes of varying sizes locates the partial eyebrows and the contour of the eye (upper and lower eyelids) as depicted in FIG. 10, step 57, since coordinates of these landmarks are local maxima of the cross-correlation function (see D. A. Pintsov, as above). As observed above, the parameters of this template (major and minor axes) are restricted to the admissible range of sizes commensurate with the range of sizes of the corresponding facial features. Depending on the power of the microprocessor employed in the communication device, it is desirable to locate more than one feature (both the eyebrow and the contour of the eye). If the values of the local maxima exceed the predetermined thresholds that reflect the minimal acceptable number of pixels lying on the eyebrows and the visible contour of the eye, the system accepts the found features (leading to step 63 in FIG. 10), otherwise the landmarks are not found and the input image of the face is rejected (FIG. 10, step 61). Finally, as in step 63, FIG. 10, the calculated positions of the eyebrow and the eyelids must be consistent since the eyebrow must be located above the eye, which the system verifies.

Partial ellipses 60 and 50 found by the template matching algorithm are shown in FIG. 5 superimposed on the actual contours of the eyebrow 37 and the eye 36, respectively. Use of more than one ellipse increases reliability of the recognition.

Since the average dimensions of these facial features are known together with the parameters of the camera lens of the mobile device (resolution, focal length, etc.) the size of the detected facial features permits finding the optimal distance to the object for a more accurate temperature measurement. When the detected feature size is smaller than the appropriate size of the image of a facial feature under known camera resolution, the distance is too large. Similarly, when the feature is larger than expected with the known camera resolution, the distance is too short. When the detected and the expected sizes are substantially the same, the distance is nearly optimal.

Figure 6:
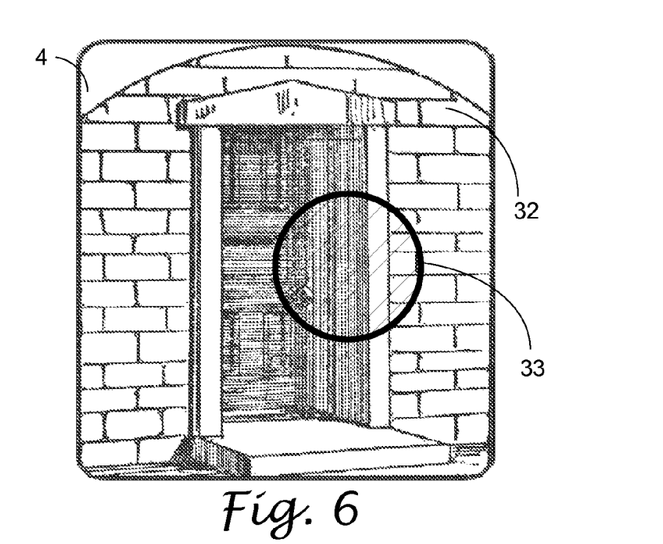
FIG. 6. shows part of a building with the field of view of an IR sensor.
Figure 7:
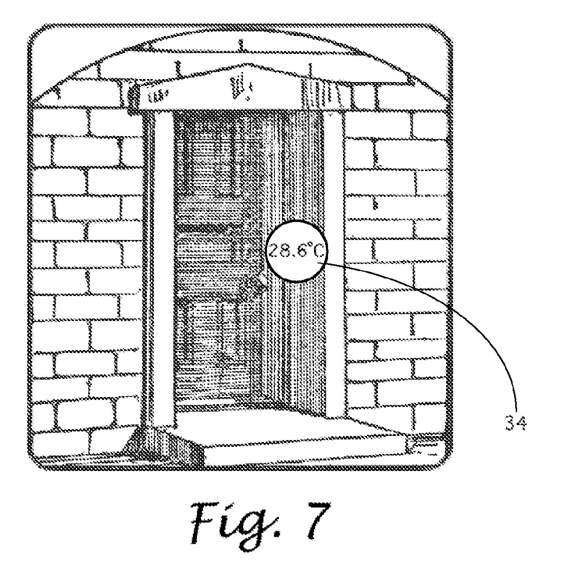
FIG. 7 illustrates the photographic image of the building structure with the temperature indication prepared for transmitting via the communication link

Another feature of the present invention is its ability of measuring the surface temperature of inanimate objects. Examples of such objects are the building structures and machinery having non-reflective surfaces in the IR spectral range of 5-15 micrometers. FIG. 6 illustrates a building door where the IR field of view 33 is superimposed on the area of interest whose temperature is to be measured. The resulting photo image can be combined with the computed temperature 34 (FIG. 7) for wireless transmission over the communication line to a remote location. The methods for calculating temperatures of human body and of non-metallic surfaces of inanimate objects are different and well known in the art and thus can be employed in the corresponding operating modes of the device. To switch between the human and non-human operating modes, a keyboard 5 can be used.

Once the aim of the IR sensor (the calculated position of the sensor) is determined, voice or image guidance from the device's output components (a speaker and/or display) assists the user in positioning the device for taking accurate temperature measurements. This assistance instructs the user how to move the mobile communication device: closer, further, left, right, up, down, etc. When the correct location is detected, a temperature reading is automatically taken, surface temperature is computed and shown on display 4, or spoken via the speaker 11 (FIG. 1), or transmitted by the wireless communication module 29 (FIG. 9).

Figure 8:
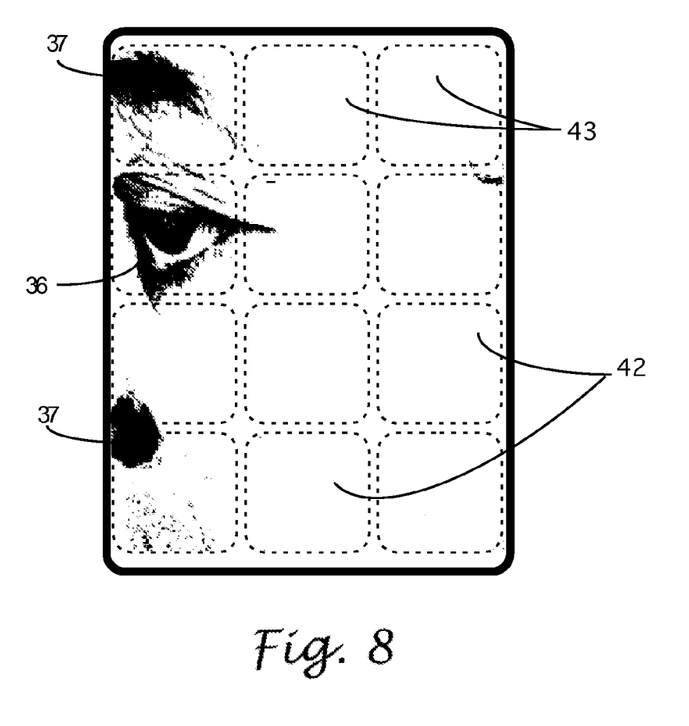
FIG. 8 shows an image of the subject superimposed on a multi-pixel IR sensor fields of view.

In another embodiment of the present invention, a more complex multi-pixel IR sensor can be employed instead of a single-pixel IR sensor. In this case, the thermopile 21 (FIG. 3) can be divided into a plurality of areas (IR pixels) that will form separate images from adjacent locations on the measured surface. FIG. 8 illustrates a multi-pixel IR image with the individual pixels 42 (total 12 in this example) that are superimposed onto the image of the subject's face. After the landmark (an eye 36, e.g.) is identified automatically, the best IR pixels 43 will be used for measuring and computing temperature. The best here means located at an optimal for temperature measurement portion of the head. Other spurious pixels 37 that are either at a wrong location or containing obstructions, such as an eyebrow or part of nose, are excluded from computation.

In case when temperature is taken from a portion of a human body, e.g a head, the inner body temperature can be computed from the skin temperature by employing one of known in the art methods.

Manual Aiming of IR Sensor

Figure 11:
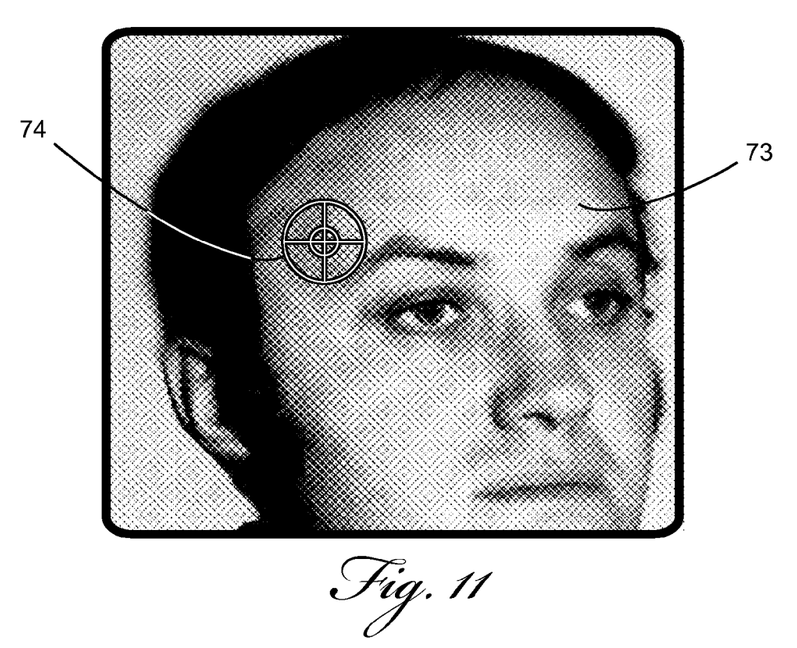
FIG. 11 shows a target on the image of the subject.

When the display of the mobile device is visible by the operator measuring the temperature (the user), which is the case when the operator takes the temperature of another subject rather than of herself, the following embodiment of the present invention is advantageous for ease of implementation. The device's display has a designated area that is demarcated by a special graphical element. This element is a circular or rectangular target 74 illustrated in FIG. 11. Other shapes may be employed. The target 74 substantially coincides with the IR sensor's field of view 70 (FIG. 2). The operator manually aims the device at the object (e.g. at the head 73). When the target 74 is superimposed on the area of an object selected for temperature measurement and the target 74 approximately encompasses an outline of the selected area, the IR sensor in terms of a location and distance is properly positioned for taking the temperature measurement. The net result is the same as with the computer-assisted method of aiming the IR lens at the optimal position 38 (FIG. 5) of the IR field of view, for example, on the subject temple.

Yet another feature of the present invention lies in the ability of the microprocessor to record and store the temperature measurements over a desired period of time and transmit via communication abilities of the device any desired data to a medical facility or personnel. This assembly of data can be plotted on the display in form of a time chart. If the communication device is equipped with a Global Positioning System (GPS) another advantage the present invention derives from using this GPS is locating the nearest to the user pharmacy and directing the user to this pharmacy to obtain the necessary drug if the temperature level warrants such an action, that is when the measured temperature exceeds a pre-defined threshold stored in the computational means.

UV Monitoring

A personal UV monitor may be useful for managing exposure to sun, for example for beach goers. For the purpose of monitoring levels of the UV radiation, a separate sensor sensitive in the range can be installed into the mobile communication device, however, its location with respect to the photographic camera is not as critical as for the IR sensor. It is important that the sensor's window can be exposed to the outside. This window should be fabricated from a material substantially transparent in the UV spectral range. Examples of the window materials are compressed inorganic salts of alkaline earth metals, such as KBr. The UV sensor in effect is a photo-detector whose sensitivity in enhanced in the UV region. A signal received from the UV sensor should be digitized, its magnitude computed and integrated over a pre-determined time by the microprocessor 26. This allows monitoring a cumulative effect of the sun exposure. A continuous integration however my not be practical when the UV sensor is incorporated with a mobile communication device that is not exposed to sun over the same period as the user. In other words, the cell phone is not laying under the sun while the user is sunbathing. This can be resolved by taking several samples of the sun UV radiation, for example, at the beginning, middle and end of exposure. Then the computational means (microprocessor 26) can interpolate the UV levels between the sample points (and can even extrapolate beyond a specific point) and compute an estimated integral level of the UV exposure. An alarm may be activated when the cumulative level of exposure reaches a pre-determined threshold stored in the computational means. The instantaneous samples of the UV radiation may be used by a computational means for suggesting a sufficient grade of the UV protection lotion.

EMF Pollution Monitoring

Figure 12:
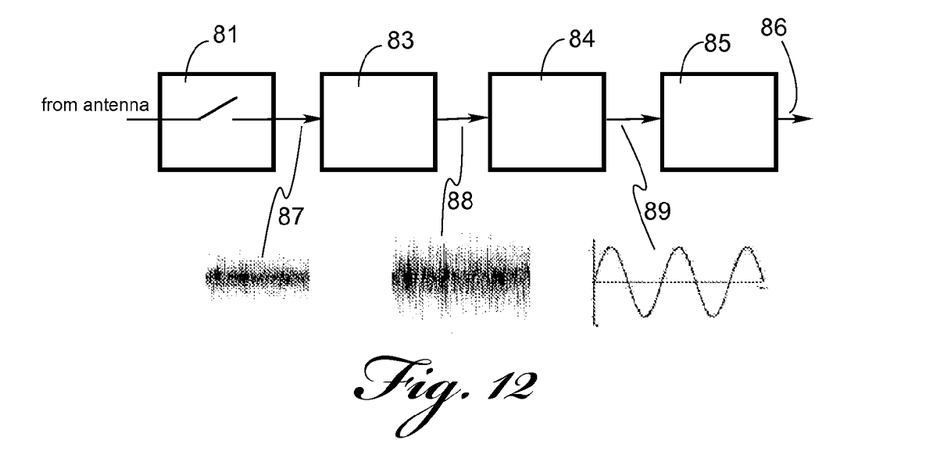
FIG. 12 illustrates a block-diagram of the EMF detecting module.

Another important function of a mobile communication device that can be accomplished according to the present invention is detection of ambient EMF intensity in the low frequency (LF) and radio frequency (RF) ranges. This embodiment takes advantage of the antenna that is always present in the mobile device. The antenna serves as a sensor of the EMF radiation when not used for communication. FIG. 9 shows the following components used for detecting EMF: the antenna switch 81 and the EMF power measurement module 82, both being controlled by the microprocessor 26 which is a computational means. When the mobile communication device is not in a signal transmission state and antenna 30 doesn't radiate, it can be used for a broadband reception of external LF and RF EMF signals. On command from microprocessor 26, switch 81 directs receiving EMF signals to the power measurement module 82 that feeds microprocessor 26 with a digital signal representing the EMF magnitude in vicinity of antenna 30. The microprocessor compares the magnitude with a pre-determined threshold and if the magnitude exceeds such a threshold, an alarm is optionally generated by an output device. Examples of such a device are the speaker 11 and vibrator 80. A visual display (monitor 12) can show a numerical value of the EMF magnitude. FIG. 12 illustrates structure of the power measurement module 82 that receives RF signal from antenna via the switch 81. This signal is generally very weak and may have shape either of continuous or pulsed noise-like voltage 87, or, alternatively a more specific shape, like a 60 Hz sine wave, e.g. Amplifier 83 brings the received signal to a higher level 88 suitable for filtering and rectification by a signal conditioner 84. The analog signal 89 is fed to the analog-to-digital converter 85 that outputs digital stream 86 for further processing by the microprocessor 26.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

The invention claimed is:

1. A mobile communication device comprising a computational means and output means, further comprising a module incorporating a non-contact temperature sensor for receiving from an external surface electromagnetic radiation in the infrared spectral range, such non-contact temperature sensor generates a signal.

2. The mobile communication device of claim 1 further comprising
a digital photographic camera for generating a digital image of the external surface, and
a signal conditioner connected to the non-contact temperature sensor for receiving and conditioning said signal, wherein the computational means is connected to the signal conditioner and adapted for calculating temperature of the externals surface from the signal generated by the non-contact temperature sensor.

3. The mobile communication device of claim 2, wherein the computational means is further adapted for calculating an optimal distance between the module and the external surface by using the digital image generated by said digital photographic camera.

4. The mobile communication device of claim 2, wherein the computational means stores a pre-defined template, said computational means is adapted for matching the digital image with the template for calculating a distance between the module and the external surface.

5. The mobile communication device of claim 4, where said template has a shape of a facial landmark, such landmark being an eyebrow, or nose, or contour of an eye, or ear.

6. The mobile communication device of claim 1, wherein said external surface is part of a head of a human.

7. The mobile communication device of claim 6, wherein the computational means is adapted for converting the surface temperature of the part of the head of a human into the inner temperature of the human.

8. A mobile communication device comprising a computational means and output means, further comprising:
a module for receiving and measuring a magnitude of electromagnetic radiation, wherein said electromagnetic radiation is generated by a source that is not being part of the mobile communication device, and such module comprising at least one antenna adapted for operation in the radio frequency range.

9. A method of measuring the magnitude of electromagnetic radiation in a selected location by a mobile communication device, consisting of the steps of:
providing a mobile communication device that comprises a housing, a digital imaging sensor having a first field of view, such sensor is for generating a digital image of the selected location, a computational means, and an output means for conveying information to an operator;
incorporating into the housing a module that is responsive to intensity of the electromagnetic radiation in a selected spectral range;
positioning the housing in a vicinity of the selected location;
generating by the module a signal representative of the electromagnetic radiation;
processing said signal to extract information related to intensity of the electromagnetic radiation in the selected location, and
sending said information to the output means for conveying the information to the operator.

10. The method of measuring the magnitude of electromagnetic radiation of claim 9 comprising a further step of
positioning in the module at least one thermopile having a second field of view wherein said first field of view is wider than the second field of view and said thermopile generates a signal representative of temperature of the selected location within the second field of view.

11. The method of measuring the magnitude of electromagnetic radiation of claim 10 further comprising the steps of
moving said housing to aim the digital imaging sensor at the selected location and observing on the output means the digital image of the selected location, wherein such selected location has a geometrical feature;
storing in the computational means a pre-defined template being a desired outline of the geometrical feature;
superimposing a template with the digital image of the geometrical feature;
indicating by the output means the moment when the template and the image of the geometrical features are substantially superimposed, and
computing temperature information from said signal, such temperature being the information related to intensity of the electromagnetic radiation.

12. The method of measuring intensity of electromagnetic radiation of claim 10, further comprising the steps of
identifying and locating by said computational means a landmark from said geometrical features within the first field of view, such landmark having salient geometrical features of the selected location;
comparing by the computational means the size and position of said landmark with a reference outline of the landmark stored in the computational means;
generating by the output means a feedback signal to the operator for moving the housing to a position where the landmark and the reference outline are substantially of the same size and substantially at the same position;
computing temperature from said signal.

13. A method of computing temperature from electromagnetic radiation being naturally emanated from a selected portion of an object by a mobile communication device, comprising the steps of
providing a mobile communication device comprising a housing, a digital imaging sensor, a computational means, and an output means for conveying information to an operator;
positioning in the housing an electromagnetic radiation detector operating in an infrared thermal spectral range and having a field of view;
positioning in the housing the digital imaging sensor and electromagnetic radiation detector in a mutual proximity and alignment;
aiming by an operator the digital imaging sensor and electromagnetic radiation detector at the object;
generating by the digital imaging sensor a first signal representative of an image of the object;
generating by the electromagnetic radiation detector a second signal representative of surface temperature of the object within the field of view;
computing the surface temperature of the object from the said second signal, and
sending the computed temperature to said output means.

14. The method of computing temperature by a mobile communication device of claim 13, further comprising the steps of
generating by the computational means a template approximating the shape of a landmark, such landmark being an identifiable part of the object;
identifying and locating said landmark by said computational means;
comparing the sizes and positions of said landmark and said template;
generating by the output means a feedback signal to the operator;
moving said housing for matching the sizes and positions of said landmark and said template.

15. The method of computing temperature by a mobile communication device of claim 13, further comprising the steps of
displaying by the output means an image of the object derived by the computational means from said first signal;
displaying a target, such target being an outline of the filed of view;
moving the housing to superimpose the target and the selected portion of the object.

16. The method of computing temperature by a mobile communication device of claim 13, further comprising the step of converting the surface temperature of the object into the inner temperature of the object.

17. The method of computing temperature by a mobile communication device of claim 13, further comprising the step of generating an alarm when temperature of the object exceeds a preset limit.

* * * * *